(12) United States Patent
Shah et al.

(10) Patent No.: US 11,277,718 B2
(45) Date of Patent: Mar. 15, 2022

(54) CUSTOMER PROFILE AND BILLING LIFECYCLE MANAGEMENT IN CONNECTED ENDPOINTS IN WIRELESS COMMUNICATION NETWORKS

(71) Applicant: T-Mobile USA, Inc., Bellevue, WA (US)

(72) Inventors: Mehul Shah, Sammamish, WA (US); Hamza Hydri Syed, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 233 days.

(21) Appl. No.: 16/452,061

(22) Filed: Jun. 25, 2019

(65) Prior Publication Data
US 2020/0413234 A1  Dec. 31, 2020

(51) Int. Cl.
| | |
|---|---|
| *H04W 4/24* | (2018.01) |
| *H04W 4/50* | (2018.01) |
| *H04L 29/08* | (2006.01) |
| *H04W 8/20* | (2009.01) |
| *H04L 67/303* | (2022.01) |

(52) U.S. Cl.
CPC .............. *H04W 4/24* (2013.01); *H04L 67/303* (2013.01); *H04W 4/50* (2018.02); *H04W 8/20* (2013.01)

(58) Field of Classification Search
CPC ........ H04W 8/183; H04W 8/18; H04W 4/24; H04W 4/50; H04W 8/20; H04L 12/14; H04L 67/303
See application file for complete search history.

(56) References Cited

U.S. PATENT DOCUMENTS

| | | | |
|---|---|---|---|
| 2008/0254766 A1* | 10/2008 | Craven ................. | H04W 8/183 455/407 |
| 2016/0050557 A1* | 2/2016 | Park ...................... | H04W 12/04 455/419 |
| 2016/0330608 A1* | 11/2016 | Benn ..................... | H04W 12/35 |
| 2017/0048645 A1* | 2/2017 | Yerrabommanahalli ..................... H04W 8/205 |
| 2017/0289790 A1* | 10/2017 | Singh .................... | H04W 8/183 |
| 2019/0174449 A1* | 6/2019 | Shan ..................... | H04W 76/11 |
| 2020/0059778 A1* | 2/2020 | Li ......................... | H04W 8/205 |

\* cited by examiner

*Primary Examiner* — Margaret G Mastrodonato
(74) *Attorney, Agent, or Firm* — Lee & Hayes, P.C.

(57) ABSTRACT

Systems and methods discussed herein are directed to managing customer Subscriber Identity Module (SIM) and embedded SIM (eSIM) profiles and allocated Mobile Station International Subscriber Directory Numbers (MSISDN) for connected devices, e.g., cars, in different use-cases. For example, in configurations, users may have a primary electronic device, e.g., a mobile phone having a primary $MSISDN_{PRIMARY}$ that is instantiated on a primary Integrated Circuit Card Identifier (ICCID), $ICCID_{PRIMARY}$ in the billing system of a wireless communication network. When the user has a secondary device paired with the mobile phone, that secondary device may have a secondary $MSISDN_{SECONDARY}$ that is activated with a secondary $ICCID_{SECONDARY}$ in the billing system. Thus, the secondary device may be used by the user in conjunction with the primary device and is paired with the primary device such that incoming calls are forked to both the primary device and the secondary device.

20 Claims, 6 Drawing Sheets

CUSTOMER PROFILE AND BILLING LIFECYCLE MANAGEMENT IN CONNECTED ENDPOINTS IN WIRELESS COMMUNICATION NETWORKS

BACKGROUND

Electronic devices are increasingly able to communicate with other entities, e.g., other electronic devices. Many of these devices are referred to as "connected devices," such as, for example, devices configured as Internet of things (IoT) devices, machine-to-machine (M2M) devices, etc. Such devices, as well as mobile communication devices, such as, for example, smartphones, portable computers, notebooks, laptops, etc., and other types of computing devices, both mobile and stationary, often communicate with other entities, e.g., servers, other similar devices, etc., via wireless communication networks.

With the advent of connected devices with Electronic or Embedded Subscriber Identity Modules (eSIMs), the concept of a paired device needs to be expanded to include several endpoints such as smart speakers, home hubs and connected vehicles (just to name a few examples) that could potentially be extensions of the primary device. Users may wish to extend the communication services in their vehicles, for example, such that it becomes an extension of their primary device. This vehicle could be personally owned or may be a shared/rental vehicle that the user may use for a short duration (e.g., 20 minutes for running errands) or for a limited period (e.g., several days while on business trips or vacations).

For example, consider a car sharing scenario where users typically share a car for 20 minutes on average. This means that there are 3 users of a car every hour and 24 users in an 8-hour day. Accounting for about a 75% take-rate, there are still 18 users in a day using a single car. If the operator of the wireless communication network were to have unique profiles for each one of the users, the operator would essentially need to have 18 different profiles just for a single car per day. Thus, it makes sense for the wireless communication network operator to avoid profile wastage.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
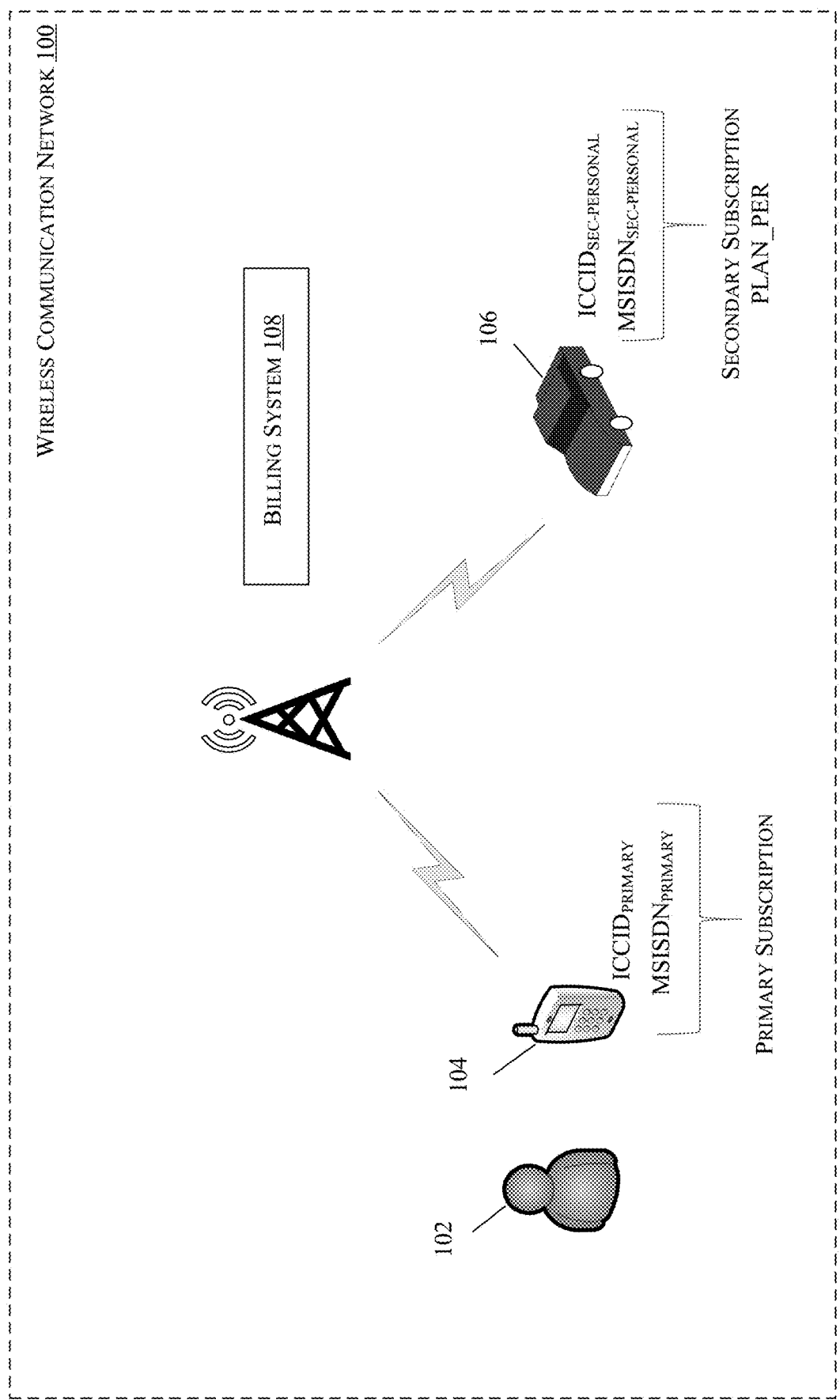
FIGS. 1A-1C are pictorial diagrams of a portion of an example wireless communication network wherein multiple subscriptions for a user's connected devices may be used in addition to a primary subscription for the user's primary device, in accordance with various configurations.

Systems and methods discussed herein are directed to managing customer Subscriber Identity Module or Subscriber Identification Module (SIM) and embedded SIM (eSIM) profiles and allocated Mobile Station International Subscriber Directory Numbers (MSISDN) for connected devices, e.g., cars, in different use-cases, especially for car sharing/rental scenarios. Techniques described herein enable wireless communication network operators to offer customized services for connected devices while helping ensure that wireless communication network operators avoid unnecessary SIM and eSIM profile wastage to serve the connected car market.

For example, in configurations, users may have a primary electronic device, e.g., a mobile phone having a primary $MSISDN_{PRIMARY}$ that is instantiated on a primary Integrated Circuit Card Identifier (ICCID), $ICCID_{PRIMARY}$ in the billing system of a wireless communication network. When the user has a secondary device, e.g., a wearable device, paired with the mobile phone, that secondary device may have a secondary $MSISDN_{SECONDARY}$ that is activated with a secondary $ICCID_{SECONDARY}$ in the billing system. The wearable device may be, for example, a watch that is used by the user in conjunction with the primary device and is paired with the primary device such that incoming calls are forked to both the mobile phone and the watch.

Thus, with the advent of connected devices, e.g., portable electronic communication devices, devices configured as Internet of Things (IoT) devices, etc., having Electronic or Embedded SIMs (eSIMs) that allow for connection to wireless communication networks, the concept of a paired device may be expanded to include several endpoints such as, for example, smart speakers, home hubs and connected vehicles (e.g., cars, trucks, motorcycles, recreational vehicles, etc.) that may potentially be extensions of the primary device. For example, users may wish to extend the communication services in their vehicles such that a vehicle becomes an extension of their primary device. Such a vehicle may be personally owned, or may be a shared/rental vehicle that the user may use for a short duration (e.g., 20 minutes for running errands), or for a limited period (e.g., several days while on business trips or vacations). While this disclosure may focus primarily on use of techniques with vehicles, the techniques described herein are equally applicable to other paired devices.

For example, as previously noted, in a car sharing scenario where users typically share a car for 20 minutes on average, this means that there are 3 users of a car every hour and 24 users in an 8-hour day. Accounting for about a 75% take-rate, there are still 18 users in a day using a single car. If the operator of the wireless communication network were to have unique profiles for each one of the users, the operator would essentially need to have 18 different profiles just for a single car per day. Thus, it makes sense for the wireless communication network operator to re-use eSIM profiles across users of the vehicles so that rather than downloading new profiles for every user of the car, a single profile is downloaded to the car and is re-used for several users thereby eliminating profile wastage.

Accordingly, in configurations, a user may activate a secondary subscription, e.g., a secondary line, for a personally owned connected car using a rate plan, (PLAN_PER), and/or the user may opt in for a rate plan for a shared vehicle/rental scenario (PLAN_SH). In the car sharing/rental scenario, it makes sense for the wireless communication network operator or Mobile Network Operator (MNO) to re-use eSIM profiles across users of the rental or shared car so that rather than downloading new profiles for every user of the car, a single profile is downloaded to the car and is re-used for several users, thereby eliminating profile wastage.

A MNO may provide differentiated experience for the customer based on the rate plan the customer selects to activate. For example, an MNO may offer various pricing tiers for adding a secondary line and/or a shared line on the account, but a user may only pay for the duration such a line is actively in use (e.g., duration based billing). The MNO may also offer an unlimited plan for secondary lines and/or shared lines.

Figure 1B:
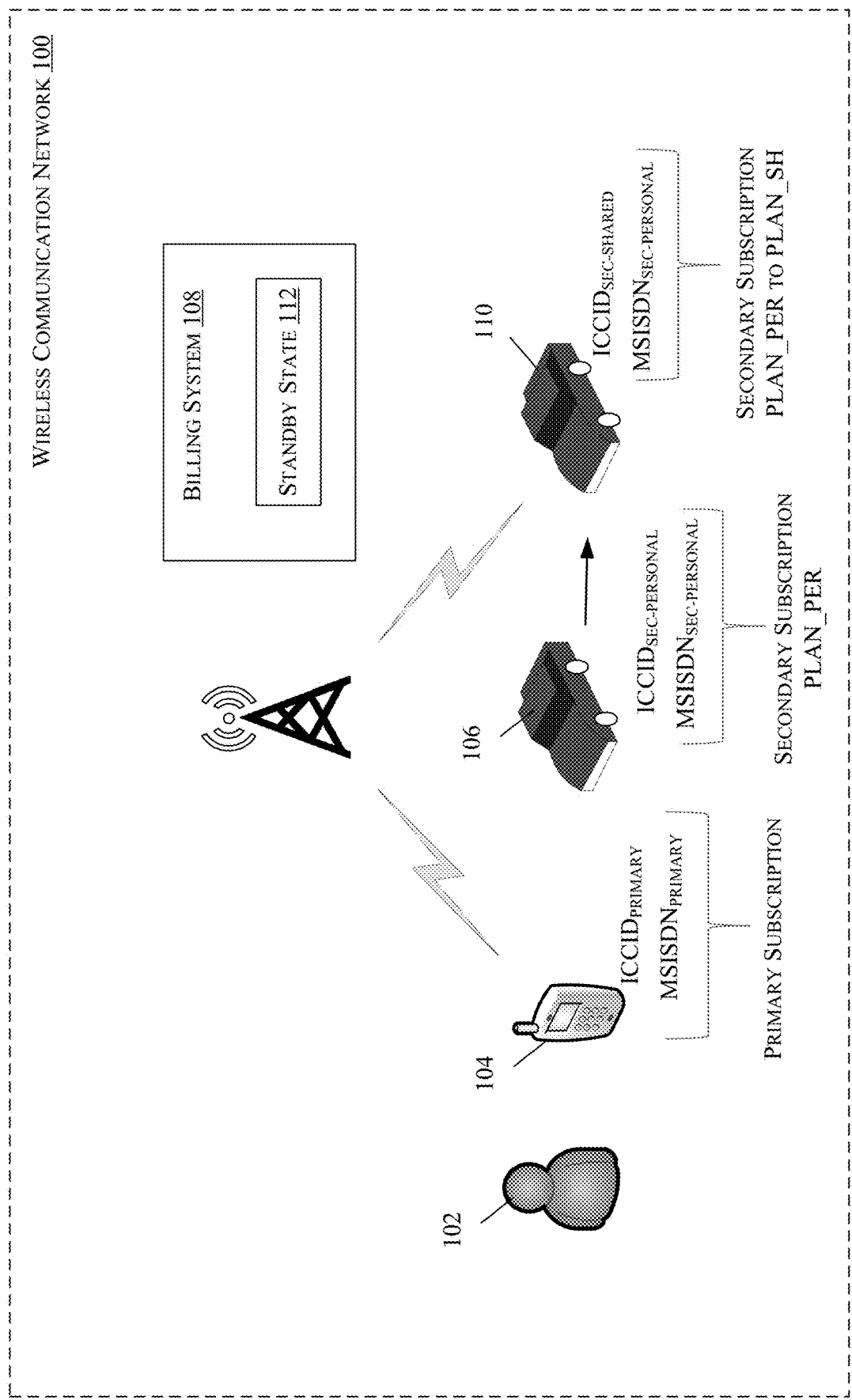
Figure 1C:
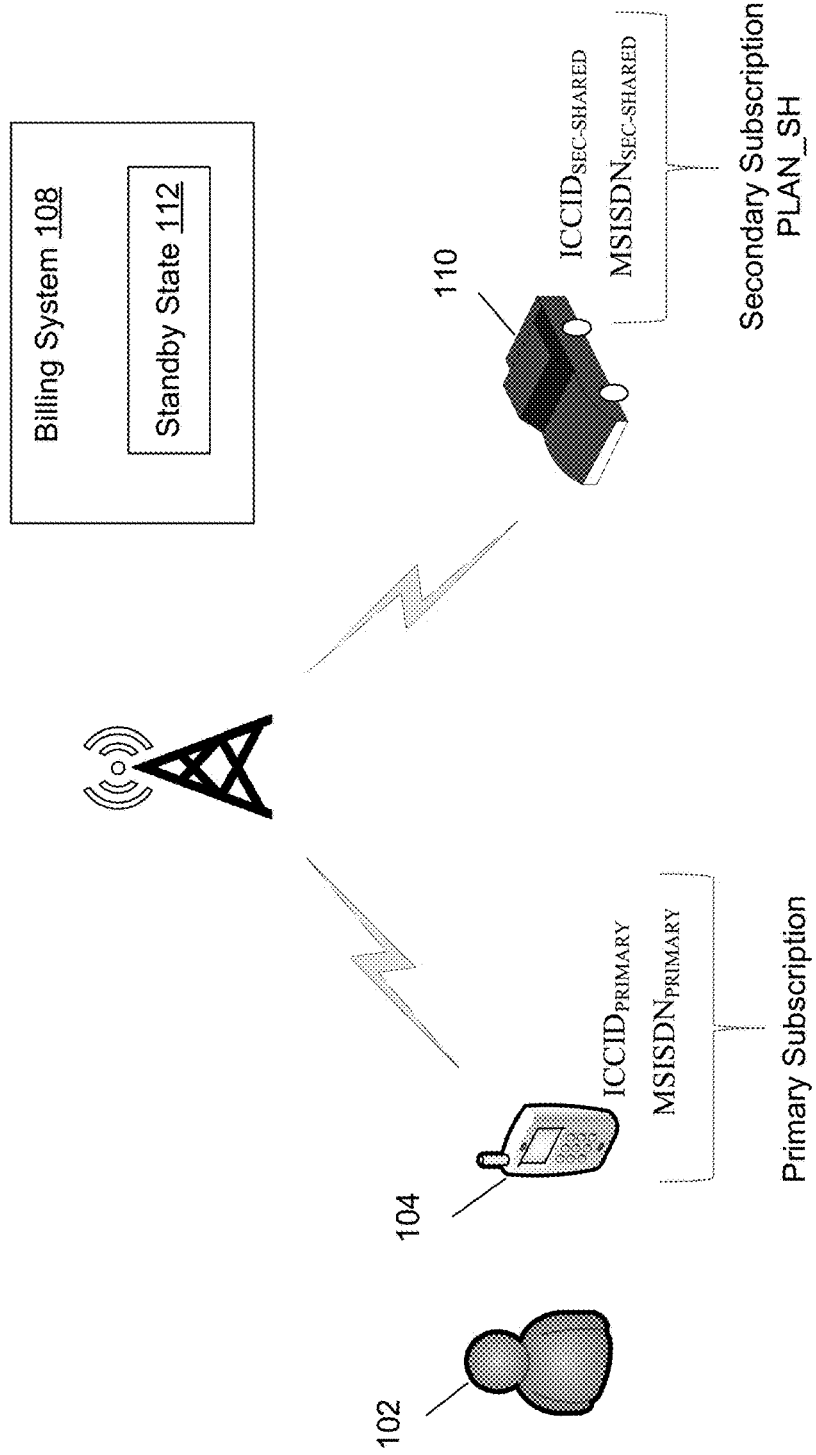

FIGS. 1A-1C schematically illustrate a portion of a wireless communication network 100, schematically illustrating three different example scenarios for secondary and/or shared lines or subscriptions (referred to herein as secondary subscription and/or shared subscription), in accordance with configurations. In the example scenario of FIG. 1A, a user 102 has an account or billing plan that includes a primary line or subscription (referred to herein as primary subscription) with an operator of the wireless communication network 100 (MNO). In configurations, the primary subscription is for a smartphone 104 and has a Mobile Station International Subscriber Directory Number (MSISDN), $MSISDN_{PRIMARY}$, instantiated on $ICCID_{PRIMARY}$.

In configurations, the user 102 may wish to extend connectivity to a personal vehicle 106. Thus, the user may obtain a secondary subscription, e.g., a second personal line, that may be identified as, for example, PLAN_PER in a billing system 108 for the wireless communication network 100.

Once the personal vehicle 106 is activated with respect to the secondary subscription, a secondary MSISDN, $MSISDN_{SEC-PERSONAL}$, may be allocated to the car 106. The secondary MSISDN, $MSISDN_{SEC-PERSONAL}$, may be associated with a secondary ICCID, $ICCID_{SEC\_PERSONAL}$. Thus, the user 102 may continue to use the wireless communication network 100 services through the smartphone 104 and the "connected" personal vehicle 106 (via the secondary subscription PLAN_PER), e.g., calls may be forked to both the smartphone 104 and the connected personal vehicle 106.

In configurations, the billing system 108 may provision the PLAN_PER on the $MSISDN_{SEC-PERSONAL}$, which allows the user 102 to access services of the wireless communication network 100 from the personal vehicle 106, while also accessing services of the wireless communication network 100 from the smartphone 104. The $MSISDN_{SEC-PERSONAL}$ is added as the secondary subscription, e.g., a second line, to the user's billing account within the billing system 108. The eSIM Local Profile Assistant (LPA) on the personal vehicle 106 may download the $ICCID_{SEC\_PERSONAL}$ from the SIM provisioning platform (e.g., SM-DP+) of the MNO after the activation of the secondary subscription is successful. The $ICCID_{SEC\_PERSONAL}$ may be installed on the personal vehicle 106 so long as the user 102 maintains the secondary subscription with the MNO.

In configurations, the user 102 may have the option to suspend/restore the secondary subscription with/from the MNO as per the user's need. Additionally, the user 102 may cancel the secondary subscription if desired. If the user 102 decides to cancel the secondary subscription with the mobile operator, the MNO may delete the $ICCID_{SEC\_PERSONAL}$ from the personal vehicle 106.

Referring to FIG. 1B, in addition to the example scenario described with respect to FIG. 1A, the user 102 may also wish to use the secondary subscription with a shared vehicle 110, e.g., a rental vehicle or other vehicles shared by multiple users, at random periods of time (car rental/long commute) scenarios. In the example scenario of FIG. 1B, the shared vehicle 110 is a shared device. Thus, the shared vehicle 110 may have a temporary "owner," e.g., one who takes ownership of the shared vehicle 110 for a finite duration (e.g., car rental or taxi service). In configurations, the shared vehicle 110 may have a shared SIM profile, $ICCID_{SEC\_SHARED}$, installed on the shared vehicle 110. The shared SIM profile may be, in configurations, pre-installed already when the user 102 checks out the shared vehicle 110 or may be installed during the checkout process when the user 102 is instantiating the connected services from the MNO for the shared vehicle 110.

In configurations, the MNO may offer a different type of rate plan for user 102 to consume services on a shared vehicle 110. Since the user 102 may already have an active $MSISDN_{SEC-PERSONAL}$ on their account for the personal vehicle 106, the user 102 may transfer the secondary subscription to the $ICCID_{SEC\_SHARED}$ on the shared vehicle 110. In configurations, such a transfer may involve the user 102 switching to a different rate plan, PLAN_SH, for the $MSISDN_{SEC-PERSONAL}$.

Once the $MSISDN_{SEC-PERSONAL}$ is instantiated on the $ICCID_{SEC\_SHARED}$, the $ICCID_{SEC\_PERSONAL}$ may be moved to a standby state 112 in the billing system 108. This helps to avoid the $ICCID_{SEC\_PERSONAL}$ being quarantined or moved into an available pool of ICCIDs to be assigned to other users by the billing system 108. Once the $MSISDN_{SEC-PERSONAL}$ is instantiated on the $ICCID_{SEC\_SHARED}$, the user 102 may access services of the wireless communication network 100 from the connected shared vehicle 110, while also accessing services of the wireless communication network 100 from the smartphone 104, e.g., calls may be forked to both the smartphone 104 and the connected personal vehicle 106.

Once the user 102 has returned the shared vehicle 110 and wishes to restore the secondary service to the personal vehicle 106, the MNO may transfer the $MSISDN_{SEC-PERSONAL}$ back to the $ICCID_{SEC\_PERSONAL}$ and change $MSISDN_{SEC-PERSONAL}$'s state to e active in the billing system 108. Once this transaction is complete, the $ICCID_{SEC\_SHARED}$ may be moved to the standby state 112 in the billing system 108. The $ICCID_{SEC\_SHARED}$ is now ready to e assigned to another MSISDN for another user that uses the shared vehicle 110. During this process, in configurations, the rate plan in the billing system 108 for the user 102 may also be updated to the secondary subscription PLAN_PER to maximize the services from the MNO. With the flexibility of differentiated rate plans (PLAN_PER v/s PLAN_SH), the MNO may provide competitive price offerings to the users based on the users' usage scenarios.

Accordingly, the process for using the user's secondary subscription with a shared vehicle 110 may include activating rate PLAN_SH on $ICCID_{SEC-SHARED}$. A new MSISDN may not be allocated upon activation of PLAN_SH. The $MSISDN_{SEC-PERSONAL}$ may be transferred to $ICCID_{SEC-SHARED}$. The $ICCID_{SEC-PERSONAL}$ is moved to the standby state 112 in the billing system 108. The $ICCID_{SEC-PERSONAL}$ is not moved to an available state in the billing system or to a quarantine state. Once the rental/sharing period is over, the $MSISDN_{SEC-PERSONAL}$ may be moved back to/associated with $ICCID_{SEC\_PERSONAL}$. The $ICCID_{SEC-PERSONAL}$ is changed back to an active state and the user 102 may again use the services of the wireless communication network 100 via both the smartphone 104 and the connected personal vehicle 106. The $ICCID_{SEC-SHARED}$ is moved back to the standby state 112 ready to be activated immediately (i.e., re-used) for the next patron of the rental/shared car 110.

Referring to FIG. 1C, in configurations, the user 102 may not have a personal vehicle secondary subscription PLAN_PER with the MNO. However, the user 102 may wish to use the connected services of the wireless communication network 100 while the user 102 is using the shared vehicle 110, which supports connected services (car rental scenarios).

In the example scenario of FIG. 1C, the customer does not have a personal connected vehicle secondary subscription PLAN_PER and hence does not have a $MSISDN_{SEC-PERSONAL}$ with the MNO. The user 102 may thus obtain a secondary subscription, PLAN_SH, in the form of a shared vehicle rate plan from the MNO. In this example scenario, the user 102 is provided a $MSISDN_{SEC-SHARED}$ on the user's billing account within the billing system 108 on which the rate plan PLAN_SH may be provisioned, which may be transferred to, e.g., associated with, a placeholder $ICCID_{SEC-DUMMY}$. The $MSISDN_{SEC-SHARED}$ is not active on the wireless communication network 100 at this point, but is only present in the billing system 108 under the association with the placeholder $ICCID_{SEC-DUMMY}$. The status of the $MSISDN_{SEC-SHARE}$ may be marked appropriately, e.g., the standby state 112, to avoid any billing cost as it is not active on the wireless communication network 100 at this point.

When the user 102 checks out a vehicle, rents a vehicle, shares a taxi service, etc., (e.g., the shared connected vehicle 110), the user 102 may have the billing system 108 transfer the $MSISDN_{SEC-SHARED}$ to the $ICCID_{SEC-SHARED}$. When this transfer is successful, the $MSISDN_{SEC-SHARED}$ becomes active on the wireless communication network 100, e.g., is no longer in the standby state 112, and in an active state in the billing system 108. The placeholder $ICCID_{SEC-DUMMY}$ may always remain in the standby state 112 in the billing system 108 to avoid being assigned to another MSISDN. Once the $MSISDN_{SEC-SHARED}$ is instantiated on the $ICCID_{SEC\_SHARED}$, the user 102 may access services of the wireless communication network 100 from the connected shared vehicle 110, while also accessing services of the wireless communication network 100 from the smartphone 104, e.g., calls may be forked to both the smartphone 104 and the connected personal vehicle 106.

When the user 102 returns the shared vehicle 110, the MNO may transfer, e.g., associate, the $MSISDN_{SEC-SHARED}$ back to the $ICCID_{SEC-DUMMY}$ and change $MSISDN_{SEC-SHARED}$'s state to the standby state 112 in the billing system 108. Once this transaction is complete, the $ICCID_{SEC-SHARED}$ may be moved to the standby state 112 in the billing system 108 and is ready for being assigned to another MSISDN for a subsequent user.

Accordingly, the process for the user 102 obtaining a secondary subscription for use with a shared vehicle 110 may include activating PLAN_SH on $ICCID_{SEC-SHARED}$. A new MSISDN is not activated, but $MSISDN_{SEC-SHARED}$ is transferred/moved from $ICCID_{SEC-DUMMY}$ to/associated with $ICCID_{SEC-SHARED}$. $MSISDN_{SEC-SHARED}$ is moved to an active state in the billing system 108. $ICCID_{SEC-DUMMY}$ is moved to the standby state 112 in the billing system 108 to avoid it being picked up for activation by any other process. Once the user 102 is finished with the rental/sharing period, the $MSISDN_{SEC-SHARED}$ is moved to/associated with $ICCID_{SEC-DUMMY}$. $MSISDN_{SEC-SHARED}$ is moved to the standby state 112 in the billing system 108. $ICCID_{SEC-SHARED}$ is moved to the standby state 112 ready to be activated immediately (i.e., re-used) for the next patron of the rental/shared car 110.

Figure 2:
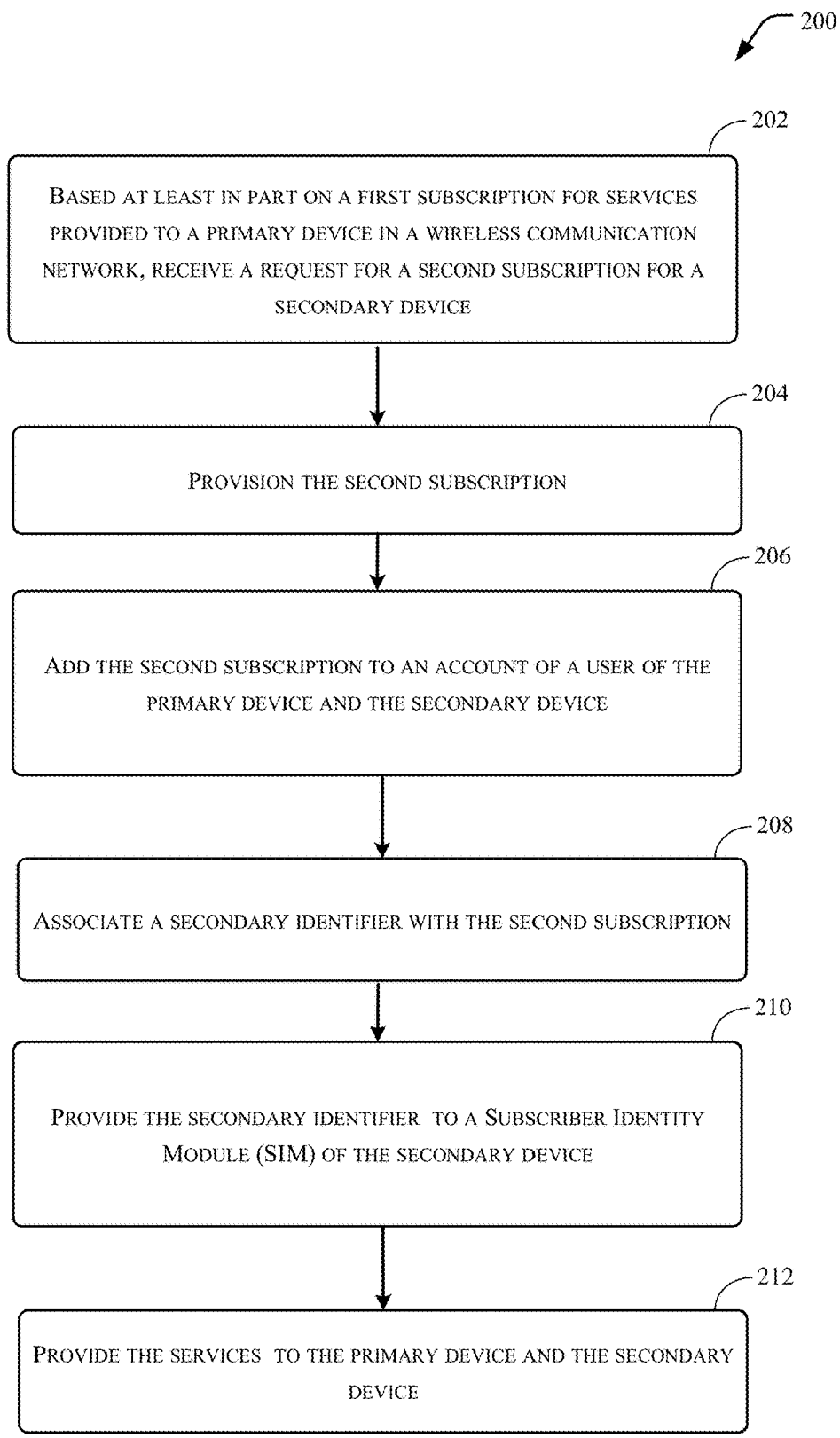
FIG. 2 is a flow diagram of an example process of provisioning a second device to receive services within the wireless communication network of FIGS. 1A-1C, where the services provided to the second device are the same services provided to a primary device, in accordance with various configurations.

FIG. 2 is a flow diagram of an illustrative process that may be implemented within or in association with the arrangements and processes of FIGS. 1A-1C. *Ibis* process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 2 is a flow diagram illustrating an example method 200 of provisioning a second device, e.g., personal vehicle 106 or shared vehicle 110 to receive services within a wireless communication network, e.g., wireless communication network 100. The services provided to the second device are the same services provided to a primary device, e.g., smartphone 104. At block 202, based at least in part on a first subscription for services provided to a primary device in a wireless communication network, a request for a second subscription for a secondary device is received. The second subscription allows the secondary device to receive the services provided to the primary device in the wireless communication network. At block 204, the second subscription is provisioned.

At block 206, the second subscription is added to an account of a user of the primary device and the secondary device. For example, the user's account may be updated within the billing system 108. At block 208, a secondary identifier, e.g., $MSISDN_{SEC-PERSONAL}$, is associated with the second subscription. At block 210, the secondary identifier is provided to a Subscriber Identity Module (SIM) of the secondary device, e.g., the secondary identifier is provided to the ICCID of the secondary device. At block 212, the services are provided to the primary device and the secondary device by the wireless communication network.

While examples herein have been described herein with respect to smartphone 104, personal vehicle 106 and shared vehicle 110, the examples are equally applicable to other devices that may be configured as a "connected device," e.g., an Internet of things (IoT) device, a machine to machine (M2M) device, etc. The connected devices may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the devices as being "mobile" (i.e., configured to be carried and moved around), it is to be appreciated that the devices may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the devices may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), 5G, IEEE 802.1x protocols, WiMAX, Wi-Fi, and/or any future IP-based network technology or evolution of an existing IP-based network technology.

Figure 3:
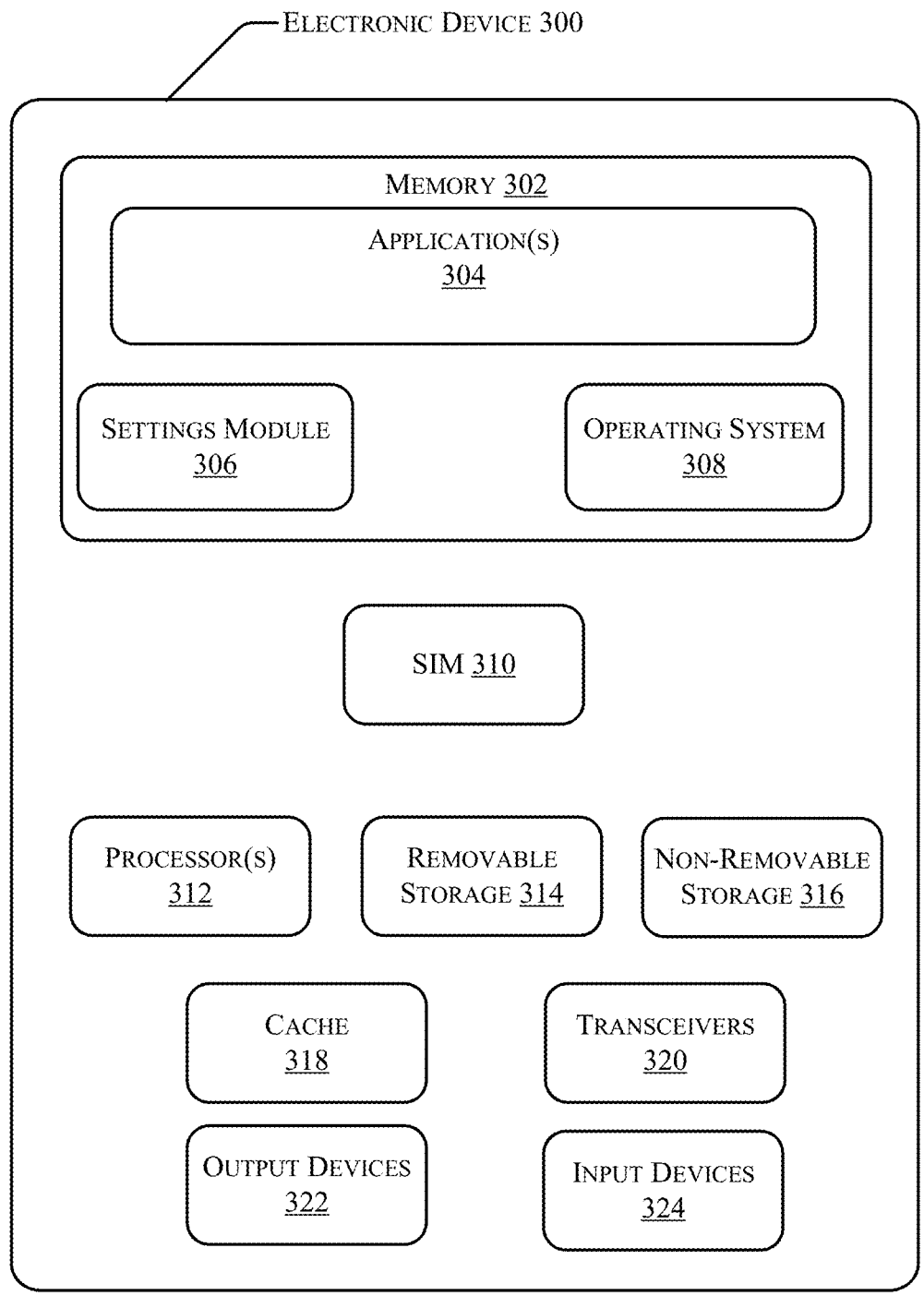
FIG. 3 schematically illustrates a component level view of an example electronic device configured for use in the wireless communication network of FIGS. 1A-1C, in accordance with various configurations.

FIG. 3 schematically illustrates a component level view of an example electronic device 300, such as smartphone 104 or other electronic devices that may be configured as connected devices, configured to function within wireless communication network 100. The electronic device 300 may include more or less components depending on the type of electronic device. As illustrated, the electronic device 300 comprises a system memory 302, e.g., computer-readable media, storing application(s) 304. The mobile device also comprises a settings module 306, and an operating system 308. The electronic device 300 also includes a SIM 310. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.), or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Figure 4:
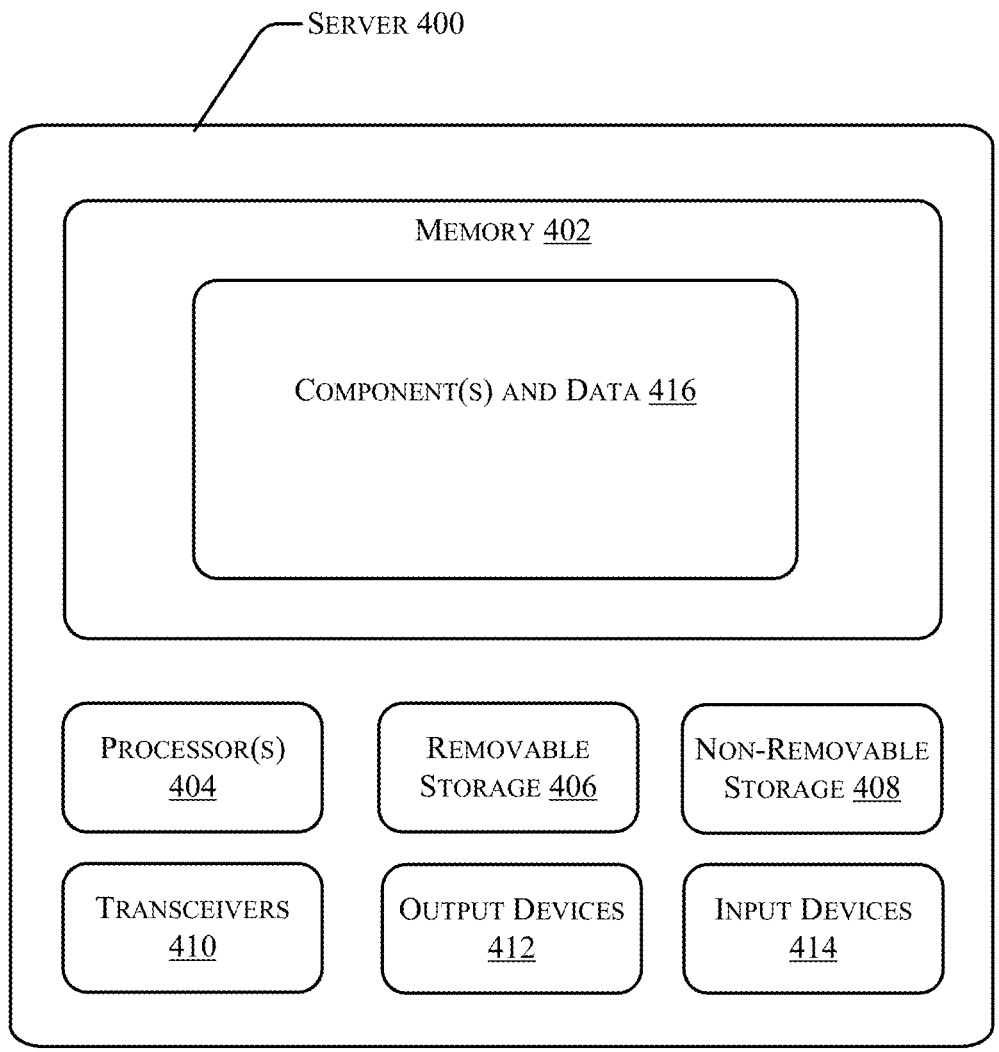
FIG. 4 schematically illustrates a component level view of a server configured for use in the wireless communication network of FIGS. 1A-1C to provide various services of the wireless communication network of FIGS. 1A-1C, in accordance with various configurations.

FIG. 4 illustrates a component level view of a server 400 configured for use within a wireless communication network, e.g., wireless communication network 100, in order to provide various services within the wireless communication network, according to the techniques described herein. As illustrated, the server 400 comprises a system memory 402 that may store one or more components and/or applications and data 416 for interacting with electronic devices 300, e.g., smartphone 104 or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A-1C and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more servers, the method comprising:
receiving, based at least in part on a first subscription for services provided to a primary device in a wireless communication network, a request for a second subscription for a secondary device, the first subscription associated with a primary Integrated Circuit Card Identifier (ICCID) and a primary Mobile Station International Subscriber Directory Numbers (MSISDN) and the second subscription allowing the secondary device to receive the services provided to the primary device in the wireless communication network;
provisioning the second subscription with a secondary MSISDN;
adding the second subscription to an account associated with the primary device and the secondary device;
allocating the secondary MSISDN to a secondary ICCID associated with the secondary device;
providing the secondary MSISDN to a Subscriber Identity Module (SIM) of the secondary device;
providing the services to the primary device and the secondary device;
transferring the secondary MSISDN to a shared ICCID associated with a shared SIM of a shared device;

suspending the secondary ICCID within the wireless communication network; and providing the services to the primary device and the shared device.

2. The method of claim 1, further comprising:

suspending providing the services to the secondary device.

3. The method of claim 2, further comprising:

transferring the secondary MSISDN to the secondary ICCID;

activating the secondary ICCID within the wireless communication network;

suspending the shared ICCID within the wireless communication network into a standby state;

suspending providing the services to the shared device; and providing the services to the primary device and the secondary device.

4. The method of claim 3, wherein the secondary device comprises a personal device and the shared device comprises a device configured for use by multiple users at different times.

5. The method of claim 1, wherein suspending the secondary ICCID within the wireless communication network comprises placing a secondary subscription into a standby state.

6. The method of claim 4, further comprising:

activating the secondary ICCID within the wireless communication network;

associating the secondary ICCID with the secondary MSISDN; and providing the services to the primary device and the secondary device.

7. The method of claim 6, wherein the secondary device comprises a device configured for use by multiple users at different times.

8. An apparatus configured for operation within a wireless communication network, the apparatus comprising:

one or more processors; and a non-transitory storage medium comprising instructions stored thereon, the instructions being executable by the one or more processors to:

receive, based at least in part on a first subscription for services provided to a primary device in a wireless communication network, a request for a second subscription for a secondary device, the first subscription associated with a primary Integrated Circuit Card Identifier (ICCID) and a primary Mobile Station International Subscriber Directory Numbers (MSISDN) and the second subscription allowing the secondary device to receive the services provided to the primary device in the wireless communication network;

provision the second subscription with a secondary MSISDN;

add the second subscription to an account associated with the primary device and the secondary device;

allocate the secondary MSISDN to a secondary ICCID associated with the secondary device;

provide the secondary MSISDN to a Subscriber Identity Module (SIM) of the secondary device;

provide the services to the primary device and the secondary device;

transfer the second subscription to a shared identifier of a shared SIM of a shared device;

suspend the secondary MSISDN within the wireless communication network into a standby state; and provide the services to the primary device and the shared device.

9. The apparatus of claim 8, wherein the instructions are further executable by the one or more processors to:

suspend providing the services to the secondary device.

10. The apparatus of claim 9, wherein the instructions are further executable by the one or more processors to:

transfer the secondary MSISDN to the secondary ICCID;

activate the secondary ICCID within the wireless communication network;

suspend the shared identifier within the wireless communication network into the standby state;

suspend providing the services to the shared device; and provide the services to the primary device and the secondary device.

11. The apparatus of claim 10, wherein the secondary device comprises a personal device and the shared device comprises a device configured for use by multiple users at different times.

12. The apparatus of claim 8, wherein suspending the secondary ICCID within the wireless communication network comprises placing the secondary MSISDN into a standby state.

13. The apparatus of claim 12, wherein the instructions are further executable by the one or more processors to:

activate the secondary ICCID within the wireless communication network;

associate the secondary ICCID with the secondary MSISDN; and provide the services to the primary device and the secondary device.

14. The apparatus of claim 13, wherein the secondary device comprises a device configured for use by multiple users at different times.

15. A non-transitory storage medium comprising instructions stored thereon, the instructions being executable by one or more processors to:

receive, based at least in part on a first subscription for services provided to a primary device in a wireless communication network, a request for a second subscription for a secondary device, the first subscription associated with a primary Integrated Circuit Card Identifier (ICCID) and a primary Mobile Station International Subscriber Directory Numbers (MSISDN) and the second subscription allowing the secondary device to receive the services provided to the primary device in a wireless communication network;

provision the second subscription with a secondary MSISDN;

add the second subscription to an account associated with the primary device and the secondary device;

allocate the secondary MSISDN to a secondary ICCID associated with the secondary device;

provide the secondary MSISDN to a Subscriber Identity Module (SIM) of the secondary device;

provide the services to the primary device and the secondary device;

transfer the second subscription to a shared identifier of a shared SIM of a shared device;

suspend the secondary MSISDN within the wireless communication network into a standby state; and provide the services to the primary device and the shared device.

16. The non-transitory storage medium of claim 15, wherein the instructions are further executable by the one or more processors to:

suspend providing the services to the secondary device.

17. The non-transitory storage medium of claim 16, wherein the instructions are further executable by the one or more processors to:
- transfer the secondary MSISDN to the secondary ICCID;
- activate the secondary ICCID within the wireless communication network;
- suspend the shared identifier within the wireless communication network into the standby state;
- suspend providing the services to the shared device; and
- provide the services to the primary device and the secondary device.

18. The non-transitory storage medium of claim 17, wherein the secondary device comprises a personal device and the shared device comprises a device configured for use by multiple users at different times.

19. The non-transitory storage medium of claim 15, wherein
- suspending the secondary ICCID within the wireless communication network comprises placing the secondary MSISDN into a standby state.

20. The non-transitory storage medium of claim 19, wherein the instructions are further executable by the one or more processors to:
- activate the secondary ICCID within the wireless communication network;
- associate the secondary ICCID with the secondary MSISDN; and
- provide the services to the primary device and the secondary device.

* * * * *